April 13, 1937. A. J. FRANCOEUR ET AL 2,076,532

VACUUM OIL BRAKE

Filed March 23, 1936 4 Sheets-Sheet 1

A. J. Francoeur
V. Matulewicz INVENTORS
BY Victor J. Evans & Co.
ATTORNEY

WITNESS J. T. L. Wright

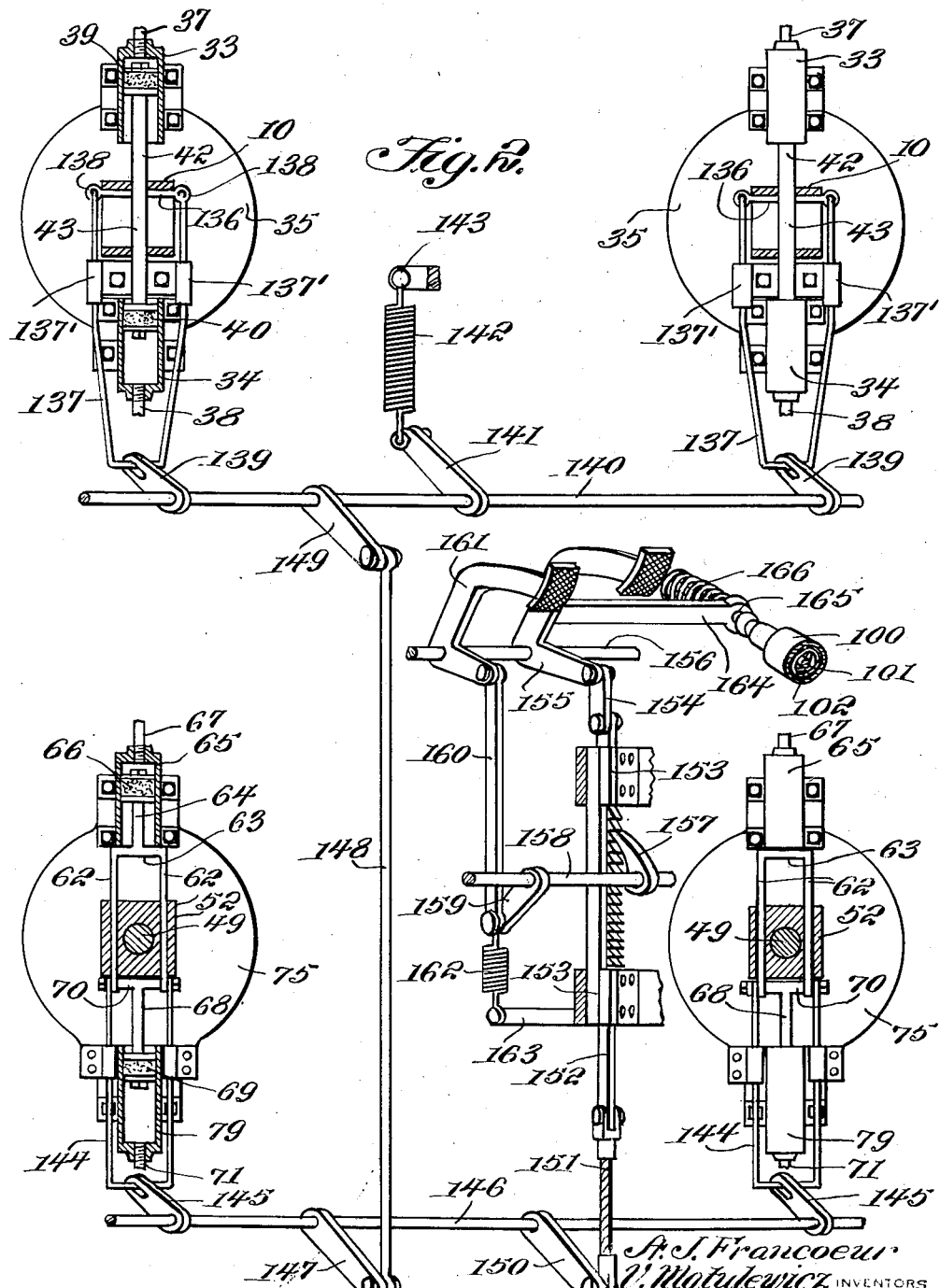

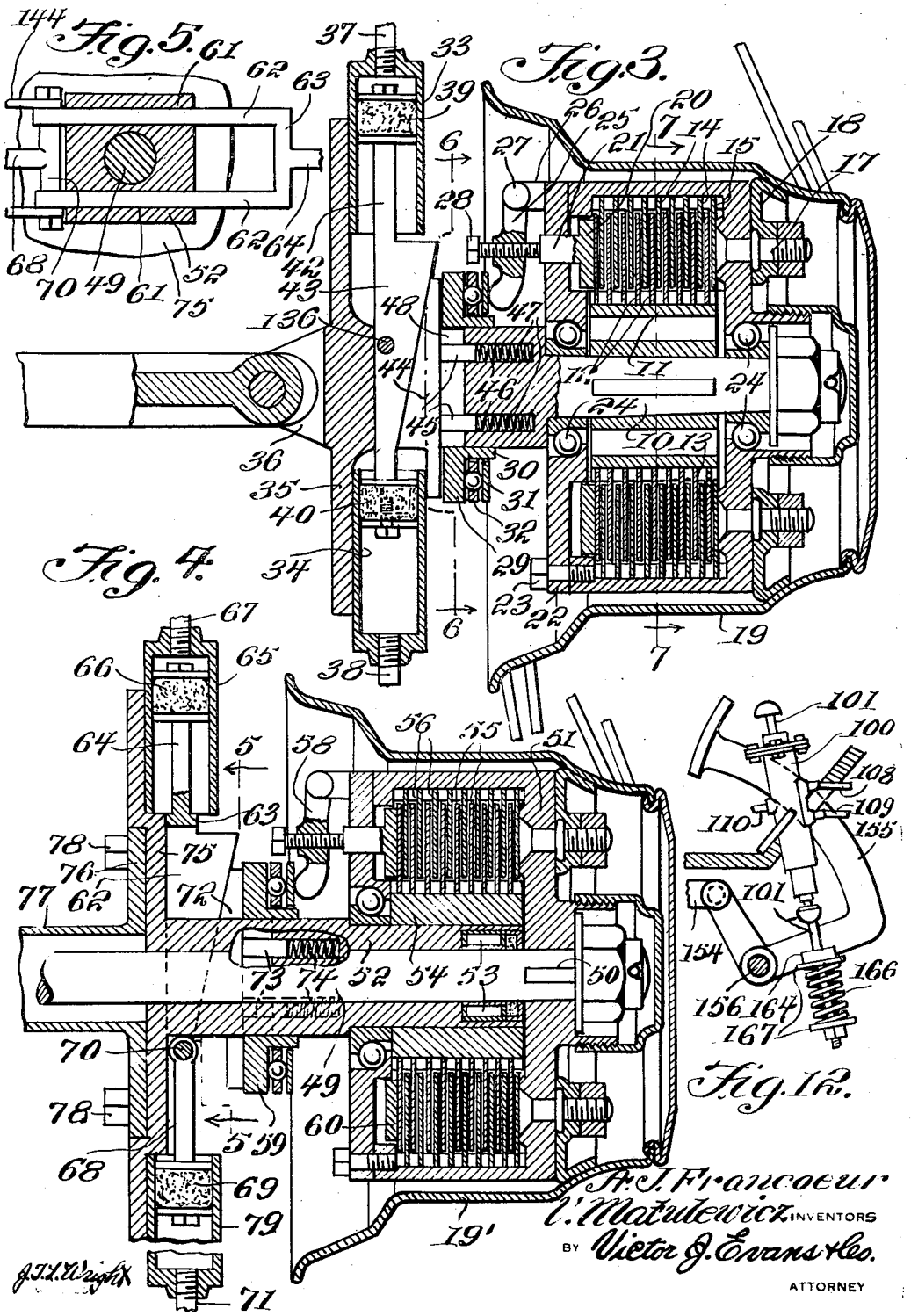

April 13, 1937. A. J. FRANCOEUR ET AL 2,076,532
VACUUM OIL BRAKE
Filed March 23, 1936 4 Sheets-Sheet 4
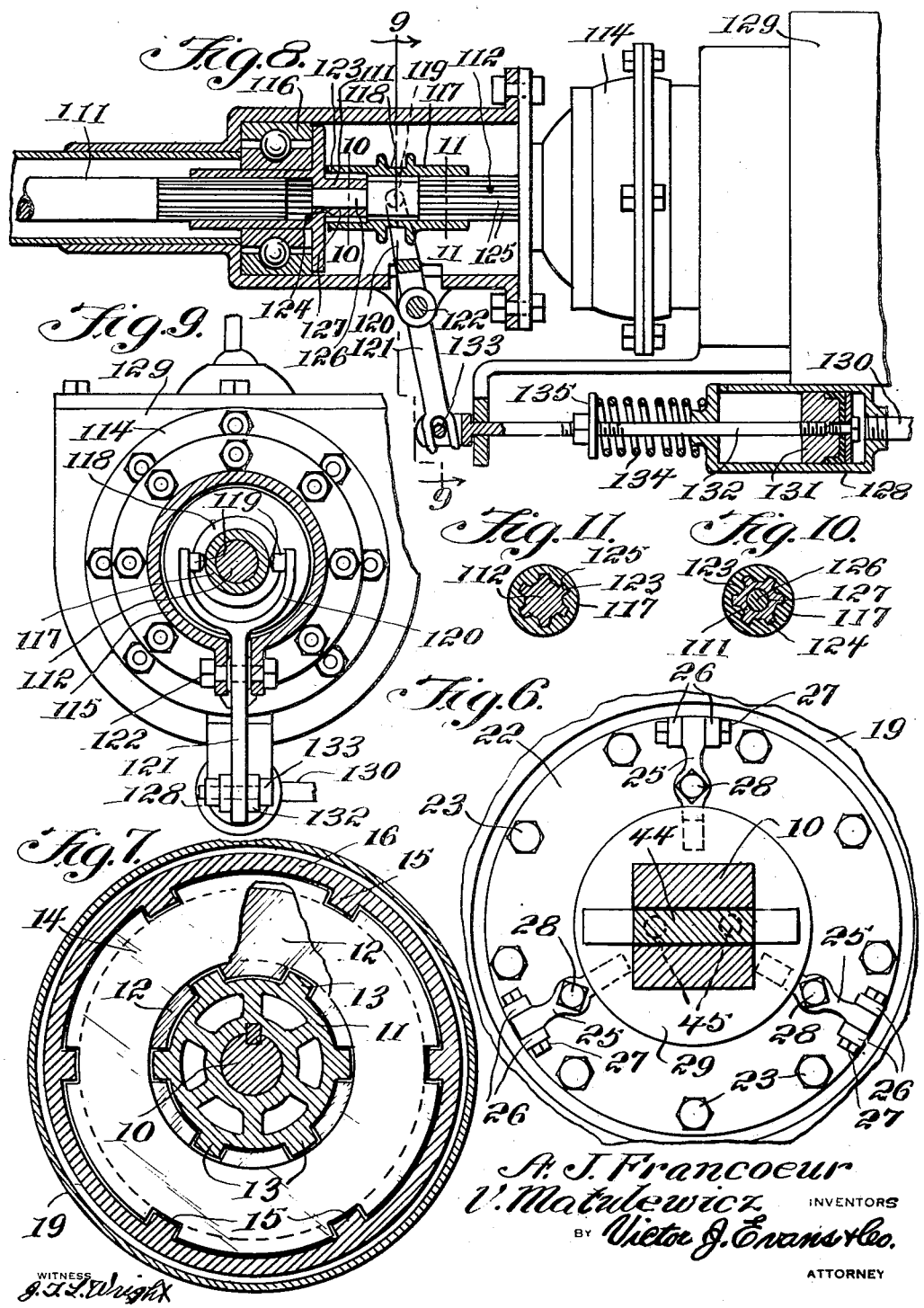

Patented Apr. 13, 1937

2,076,532

UNITED STATES PATENT OFFICE 2,076,532

VACUUM OIL BRAKE

Alfred J. Francoeur and Vincent Matulewicz, Fall River, Mass.

Application March 23, 1936, Serial No. 70,464

3 Claims. (Cl. 188—152)

This invention relates to brakes for motor vehicles and has for an object to provide a vacuum operated brake mechanism which will be positive in action, responsive to slight pressure of the operator's foot on the control valve, and which will equalize braking pressure on all four wheels without any adjustment for this purpose.

A further object is to provide a vacuum operated brake mechanism which will embody mechanism for disconnecting the propeller shaft when there is insufficient vacuum to apply the brakes so that the vehicle cannot be driven until the vacuum is restored.

A further object of the invention is to provide brake mechanism of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the apended claims without departing from the spirit or sacrificing any of the advantages of the invention.

In the accompanying drawings forming part of this specification,

Figure 2 is a diagrammatic perspective view showing mechanism for setting the brakes by means of a conventional brake pedal.

Figure 3 is a longitudinal sectional view through a front wheel of the vehicle showing the disc type brake and the vacuum operated devices for setting and releasing the brake.

Figure 4 is a view similar to Figure 1 but showing similar brake mechanism applied to a rear wheel of the vehicle.

Figure 5 is a detail cross sectional view taken on the line 5—5 of Figure 4.

Figure 6 is a detail cross sectional view taken on the line 6—6 of Figure 3.

Figure 7 is a detail cross sectional view taken on the line 7—7 of Figure 3.

Figure 8 is a cross sectional view showing the sectional propeller shaft and coupling sleeve and also showing the mechanism for uncoupling the shaft when the vacuum fails.

Figure 9 is a detail cross sectional view taken on the line 9—9 of Figure 8.

Figure 10 is a detail cross sectional view taken on the line 10—10 of Figure 8.

Figure 11 is a detail cross sectional view taken on the line 11—11 of Figure 8.

Figure 12 is a detail side elevation showing the control valve and the brake pedal.

Figure 1:
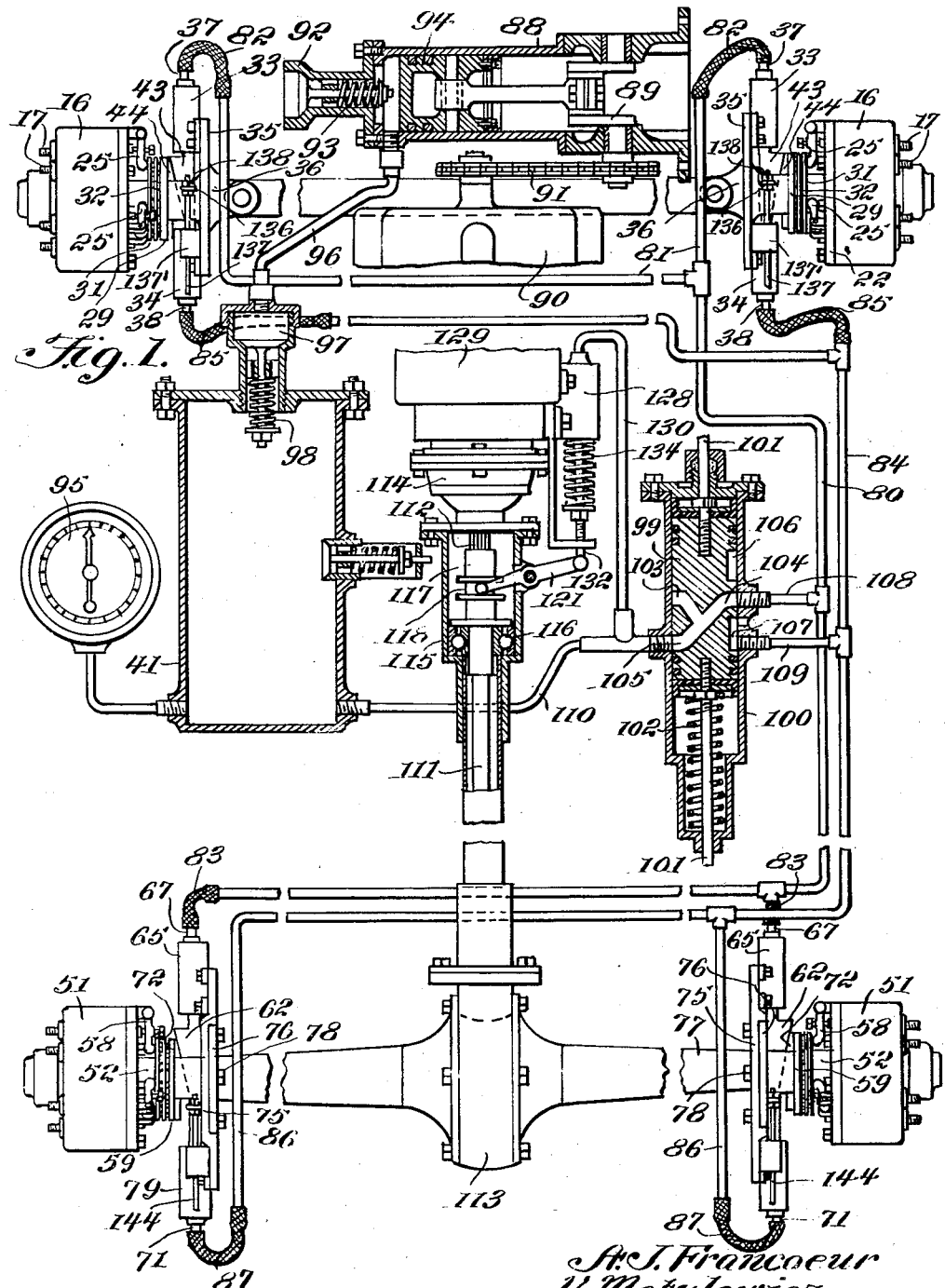
Figure 1 is a plan view of an automobile chassis, with parts removed, and with vacuum operated brake mechanism constructed in accordance with the invention applied thereto, parts of the mechanism being shown in section.

Referring now to the drawings in which like characters of reference designate similar parts in the various views, each wheel is equipped with a brake of the disc-type. The spindle 10 of each front wheel has keyed thereto a spider 11 as shown in Figure 7. A plurality of stationary discs 12 are splined on the spider as shown at 13. A plurality of rotatable discs 14 are inter-leaved with the stationary discs and the rotatable discs are splined, as shown at 15, to a brake drum 16 which is secured by bolts 17 to the flange 18 of the wheel hub 19.

An abutment ring 20, as best shown in Figure 3, bears upon the innermost one of the stationary discs 12 and is secured by means of three studs 21 to a drum head 22 which is bolted, as shown at 23 in Figure 6 to the brake drum 16 and forms a head for the inner open end of the drum. Ball bearings 24 are interposed between the rotating drum and the spindle to reduce friction.

Three levers 25, as shown in Figure 6, are pivoted at the outer ends between respective hinge ears 26 on the drum head 22 through which ears, and the levers, pivot bolts 27 are passed. The levers extend radially toward the spindle and each lever intermediate its ends is provided with a fulcrum screw 28 which bears against an associated stud 21 of the abutment ring 20. When the levers are rocked on the pivot bolts 27, the fulcrum screws 28 will urge the studs to shift the splined stationary discs 12 against the splined rotary discs 14 and apply the brake, in the usual manner.

A shift ring 29 is provided with a hub 30 which is mounted on the spindle to slide toward and away from the drum. A ring 31 is loose on the hub 30 and bears upon the free ends of the levers 25. A ball bearing assembly 32 is interposed between the shift ring 29 and loose ring 31. Movement of the shift ring toward the drum applies the disc brake and movement of the shift ring away from the drum releases the disc brake.

A pair of opposed vacuum cylinders 33 and 34 are mounted on brackets 35 that are formed integral with the spindle 10 and with a part of the steering knuckle 36. The cylinders are open at the inner ends and the outer ends are equipped with respective pipes 37 and 38 which subject pistons 39 and 40 to vacuum in a vacuum tank 41 as will hereinafter be described in detail. The pistons are provided with a common piston rod 42 which is equipped with an integral wedge 43. The wedge face of the wedge is disposed in in- 46 in the spindle and slidably mount the wedge 44 which is interposed between the shift ring 29 and wedge 43. A pair of pins 45 enter sockets 46 in the spindle and slidably mount the wedge 44 on the spindle. Helical springs 47 are seated in the sockets and constantly urge the pins outwardly to hold the wedge 44 snugly against the wedge 43. The wedge 43 of each front wheel is provided with a pin 136, later described, for mechanically holding the brakes applied.

When the piston 40 is moved under influence of the vacuum in the cylinder 34 the wedge 43 will be moved longitudinally upon the wedge 44 and force the latter against the shift ring 29, to apply the disc brake. Conversely when the piston 39 is subjected to vacuum in the cylinder 33 the wedge 43 will be retracted longitudinally of the wedge 44 to permit the latter being moved toward the steering knuckle by its controlling springs and release pressure upon the shift ring 29 to release the disc brake. A transverse slot 48 in the spindle permits the movement of the wedge 44 as just described.

The disc brake construction of each of the rear wheels is similar to the disc brake construction of the front wheels of the vehicle with the exception that the axle 49 is keyed as shown at 50 to the drum 51 and rotates as a unit with the drum and wheel. The axle housing 52 is provided with roller bearings 53 to reduce friction between the housing and the rotating axle and is provided with an integral collar 54 upon which the stationary friction discs 55 are splined. The rotary friction discs 56 are splined to the brake drum 51. Levers 58 similar to the above described levers 25 are actuated by a shift ring 59 similar to the shift ring 29 above described to move an abutment plate 60 similar to the abutment plate 20 above described for setting or releasing the friction discs.

Since the axles of the rear wheels 19' rotate in contrast to the spindles of the front wheels being non-rotatable, provision is made to assemble the brake operating wedges with the axle housing as will now be described.

As will be seen by referring to Figure 5 the rear axle housing 52 is provided with a pair of slots 61 which receive parallel wedges 62 that are connected by a cross member 63 at one end which latter is connected to a piston rod 64 in a vacuum cylinder 65. The piston 66 of this cylinder is subjected to vacuum from the vacuum tank through a pipe 67 to move the wedges as a unit in one direction to release the brake.

The piston rod 68 of the mating vacuum operated piston 69 is connected to the wedges 62 by means of a bolt 70. Thus, when the piston 69 is subjected to vacuum in its cylinder 79 through a pipe 71 the wedges 62 will be advanced to force laterally a pair of wedges 72 which are disposed in the slots 61 between the wedges 62 and the shift ring 59. Movement of the wedges 72 toward the brake drum urges the shift ring 59 to apply the disc brake while movement of the wedges 72 in the opposite direction releases pressure upon the shift ring 59 to release the brake.

The wedges 72 are slidably mounted for movement under impulse of the wedges 62 by means of a pair of pins 73 which enter sockets in the housing 52. Helical springs 74 in the sockets bear upon the pins and constantly urge the wedges 72 toward the wedges 62.

The vacuum cylinder assembly is mounted on the axle housing by means of brackets 75 which are formed integral with the axle housing 52 and which are reinforced and strengthened by arms 76 integral with the conventional differential part of the axle housing 77. Bolts 78 are passed through the arms 76 and into the brackets 75 to rigidly mount the vacuum cylinder assembly on the axle housing.

By now referring to Figure 1 it will be seen that a vacuum pipe 80 is provided with branch pipes 81 which communicate with the front vacuum cylinders 33 of the front wheels through flexible hose 82. Likewise the vacuum pipe 80 communicates with the front vacuum cylinders 65 of the rear wheels through flexible hose 83. Thus vacuum in the pipe 80 actuates simultaneously the wedges of the front wheels and the rear wheels in a direction to release the disc brakes of the wheels.

A vacuum pipe 84 communicates with the rear vacuum cylinders 34 of the front wheels through flexible hose 85 and also is provided with branch pipes 86 which communicate with the rear vacuum cylinders 79 of the rear wheels through flexible hose 87. Vacuum in the pipe 80 consequently simultaneously actuates the wedges of the front wheels and the rear wheels in a direction to apply the brakes of the wheels.

The above mentioned vacuum tank 41 is evacuated by means of a vacuum pump 88 the crank shaft 89 of which is driven from the motor 90 by means of a belt drive 91 or other suitable motion transmission mechanism. A check valve 92 in the vacuum chamber of the pump is controlled by a spring 93 to open outwardly upon forward stroke of the pump piston 94 and to close upon the working stroke of the piston, to create minus pressure or vacuum, or any desired degree of vacuum in the tank 41, which vacuum is indicated in inches by a gauge 95 connected with the vacuum tank. A pipe 96 leads from the vacuum chamber of the pump to the vacuum tank 41 and this pipe is controlled by a check valve 97 suitably mounted on the vacuum tank and controlled by its spring 98 to open outwardly during the suction stroke of the pump piston 94 and to close during the compression stroke of the piston.

For selectively permitting the vacuum tank to be connected to the pipes 80 and 84 a valve 99 of the plunger type is mounted to move longitudinally in a valve housing 100 which may be suitably secured to the vehicle chassis so that the valve stem 101 may be located within convenient reach of the driver's foot, as shown in Figure 12. A spring 102, as best shown in Figure 1, is disposed in the valve housing and tends constantly to hold the valve at its limit of movement in one direction so that the valve stem will be normally held raised in position to be easily depressed by the driver's foot. The valve 99 is provided with a substantially Y-shaped passage having aligned ports 103 and 104 opening through the valve at diametrically opposite points thereof and having a port 105 opening through the valve on the same side thereof as the port 103. There are two chambers 106 and 107 disposed in the valve on opposite sides of the port 104 and vented to the atmosphere. A pipe 108 is connected to the vacuum pipe 80 and opens into the valve housing. A second pipe 109 is connected to the vacuum pipe 84 and opens into the valve housing. A pipe 110 is connected to the vacuum tank 41 and opens into the valve housing opposite the pipe 109.

In neutral position the valve 99 is held by its spring 102 to dispose the port 105 in registration with the pipe 110 and to hold the port 104 in registration with the pipe 108. At the same time the chamber 107 is disposed in registration with the pipe 109. In this position of the valve vacuum exists in the pipe 108, and the vacuum pipe 80, while at the same time the pipe 109 and vacuum pipe 84 are vented to the atmosphere. As a result, the wedges in the front vacuum cylinders of the front wheels and the front vacuum cylinders of the rear wheels are disposed in neutral position to hold the brakes of the wheels released. When the operator depresses the valve stem 101 with his foot the valve is moved against the tension of its spring 102 to dispose the port 103 in registration with the pipe 110 and to dispose the port 104 in registration with the pipe 109. At the same time the chamber 106 is disposed in registration with the pipe 108. In this position of the valve vacuum exists in the pipe 109, and vacuum pipe 84, and is exerted on the pistons in the rear vacuum cylinders 34 of the front wheels and the rear vacuum cylinders 79 of the rear wheels to move the wedges in a direction to set the brakes of these wheels, such application of the brakes being facilitated by atmospheric pressure in the pipe 80 acting upon the pistons in the front cylinders 33 of the front wheels and in the front cylinders 65 of the rear wheels. When the driver removes his foot from the valve stem, the valve spring immediately returns the valve to neutral position to hold the brakes of all of the wheels released.

In the event the vacuum in the tank 41 is not sufficient to apply the brakes when the valve 99 is operated the propeller shaft of the motor vehicle is disconnected from the motor by mechanism about to be described so that the vehicle cannot be run until the cause of the insufficient vacuum is discovered and repaired.

By now referring to Figure 8 it will be seen that the vehicle propeller shaft is formed of two aligned sections 111 and 112, the former being connected to the differential 113 and the latter being connected to the motor through the universal joint 114. A housing 115 is bolted to the universal joint housing and a roller bearing assembly 116 is disposed between the housing and the section 111 of the propeller shaft. A sleeve 117 is slidably fitted on the sections 111 and 112 of the propeller shaft and is provided with a circumferential groove 118 to receive the gudgeons 119 of the branches 120 of a shift lever 121 which is pivoted as shown at 122 on the housing 115.

The sleeve is provided with longitudinal teeth 123 which extend through the sleeve from end to end and mesh with longitudinal teeth 124 on the section 111 of the propeller shaft and with longitudinal teeth 125 on the section 112 of the propeller shaft to normally couple the sections of the shaft together so that both sections turn as a unit. When the sleeve is slid toward the universal joint by movement of the shift lever 121 the teeth 123 will be withdrawn beyond the teeth 124 of the propeller shaft section 111 and disconnect the latter section from the motor so that the vehicle cannot be run by motor power. A guide pin 126 carried by the section 112 of the propeller shaft enters a slot 127 formed in the end of the section 111 of the propeller shaft and holds the sections in alignment so that movement of the sleeve in either direction may be made without obstruction.

By referring to Figure 1 it will be seen that a vacuum cylinder 128 is secured to the transmission housing 129 and is connected by a pipe 130 to the vacuum pipe 110 leading from the vacuum tank 41. A vacuum piston 131 in the cylinder is provided with a piston rod 132 which is terminally connected to the shift lever 121 as shown at 133. A spring 134 is mounted on the piston rod 132 and is confined under tension between a stop 135 on the piston rod and the adjacent head of the cylinder to oppose influence of the vacuum on the piston 131, in which position of the parts the shift lever 121 maintains the coupling sleeve 117 in operative position to couple the sections of the propeller shaft together. When the vacuum in the tank 41 is insufficient to apply the brakes, that is, insufficient to hold the piston 131 in neutral position, the spring 134 immediately expands and shifts the lever 121 to slide the coupling sleeve 117 to inactive position on the propeller shaft 112 thus preventing power being transmitted to the rear wheels of the vehicle. The vehicle will thus be out of commission until the cause of the loss in vacuum is located and the proper repairs made.

It is desirable that mechanical apparatus be available for holding the brakes applied independently of the vacuum operated mechanism, as for instance when the vehicle is parked on the highway or standing at night in the garage, and for this purpose it will be seen by referring to Figure 2 that the wedge 43 of each front wheel is provided with a pin 136. A U-shaped link 137 has the ends of its legs connected to the ends of the pin, as shown at 138. The legs are slidably fitted in guide sleeves 137' secured to the brackets 35. The bight of the link is pivotally connected to a crank 139. The cranks of both front wheels are connected to a crank shaft 140 which is disposed transversely of the chassis of the vehicle and is provided intermediate its ends with a crank arm 141 which is connected to a spring 142 which is secured at one end to a bracket arm 143 on the chassis. The spring constantly tends to hold the crank shaft 140 at such angular position that the wedges 43 will be maintained in neutral position. When the crank shaft is rocked against the tension of the spring, the links 137 will be moved to dispose the wedges 43 in operative position to apply the brakes. Likewise the pin 70 of the wedge of each rear wheel has connected thereto the ends of the legs of a U-shaped link 144, the bights of both links being connected to cranks 145 carried by a crank shaft 146 having a crank arm 147 that is connected by a link 148 to a crank arm 149 on the above mentioned crank shaft 140. Thus the brake setting wedges of both the front wheels and the rear wheels are connected together for movement as a unit to brake setting position and to brake releasing position.

The rear crank shaft 146 is provided with a crank 150 to which is connected a cable 151. The cable is terminally connected to a rack 152 which is slidably fitted in guides 153 secured in any preferred manner to the chassis. The rack is connected by a link 154 to a brake pedal 155 which is pivotally mounted on a shaft 156. When the brake pedal 155 is depressed by the operator's foot the rack will be moved forwardly and through the instrumentality of the cable 151 and the crank arm 150, will rock the rear crank shaft 146, and simultaneously therewith the front crank shaft 140, to move the wedges 43 and 62 of the front and rear wheels to brake applying position.

A pawl 157 is fixed to a rock shaft 158, suitably secured to the vehicle chassis, and locks the rack in operative position to maintain the brakes set until the pawl is released. For releasing the pawl the rock shaft is equipped with a crank 159 which is connected by a link 160 to a pedal 161 that is pivotally mounted on the pivot shaft 156 adjacent the pedal 155. When the operator's foot is placed on both pedals the rack will be withdrawn sufficiently to disengage the pawl 157 whereupon the rock shaft 158 is immediately turned on its axis to swing the pawl 157 out of the path of the teeth of the rack. The beforementioned spring 143 immediately pulls the cable 151 to return the rack to neutral position. A spring 162 is connected to the crank arm 159 and to a stationary bracket 163 and rocks the rock shaft 158, as soon as the driver releases the pedal 161, to dispose the pawl 157 in position to again engage the rack and lock the rack in operative position as just described.

It will be understood that the vacuum normally holds the brakes released so that the vacuum must be released to permit application of the brakes by the brake pedal 155. For this purpose a bar 164 is disposed to project laterally from the pedal 155 and is provided at the end with an opening 165 to receive the valve stem 101 of the vacuum controlled valve 99. A spring 166, best shown in Figure 12, is confined between superposed washers 167, the uppermost of which is slidable on the valve stem below the bar 164 and the lowermost of which is fixed to the valve stem. When the pedal 155 is depressed the bar 164 will press down upon the upper washer 167 and through the spring 166 will move the valve stem 101 downward to move the valve 129 so that the vacuum will be released from the cylinders 40 on the front wheels and cylinders 79 on the rear wheels.

However, the bar 164 does not interfere with the independent operation of the vacuum controlled valve since the valve stem 101 thereof may be depressed without striking the arm 164, the valve stem moving freely through the opening 165 for this purpose. Only when the pedal 155 is used to set the brakes when parking the car for any length of time, or for emergency use, does the bar 164 affect the vacuum controlled valve and then only to release the vacuum that is holding the brakes released.

It is preferable to submerge all of the friction discs of the disc brakes in oil to reduce heating and lubricate the discs so that wear will be reduced to a minimum.

Since the operation of the invention has been described as the description of the various mechanisms progressed, it is thought that the invention will be fully understood without further explanation.

What is claimed is:

1. Motor vehicle brake mechanism comprising friction discs, companion wedges having their wedge faces in sliding contact with each other, opposed vacuum responsive pistons connected to respective ends of one of the wedges for moving the same longitudinally of the other wedge, said other wedge being yieldably mounted to move longitudinally of the axis of the friction discs and engage the friction discs to compress or release the friction discs according to the direction of movement imparted to the first named wedge by said pistons, and means for alternately subjecting the pistons to vacuum.

2. Motor vehicle brake mechanism comprising friction discs, companion wedges, one of the wedges being mounted to move toward and away from the discs for compressing and releasing the discs, the other wedge being slidable longitudinally of the first named wedge to actuate the first named wedge, a pair of opposed vacuum responsive pistons connected to respective ends of the longitudinally movable wedge for moving the wedge, cylinders for the pistons, a source of vacuum supply connected to the cylinders, and a manually controlled valve for connecting one of the cylinders to said source of vacuum supply and simultaneously connecting the other cylinder with the atmosphere.

3. Motor vehicle brake mechanism comprising friction discs, companion wedges relatively movable with respect to each other, levers for compressing and releasing the discs, a shift ring for moving the levers, one of the wedges being spring pressed and yieldably engaging the shift rings, a pair of opposed vacuum responsive pistons connected to respective ends of the other wedge to move the same endwise upon the mating wedge to apply or release the friction discs, cylinders for the pistons, a source of vacuum connected to the cylinders, and a control valve for subjecting the pistons selectively to vacuum on one side and atmospheric pressure on the other side to actuate the last named wedge.

ALFRED J. FRANCOEUR.
VINCENT MATULEWICZ.